UNITED STATES PATENT OFFICE.

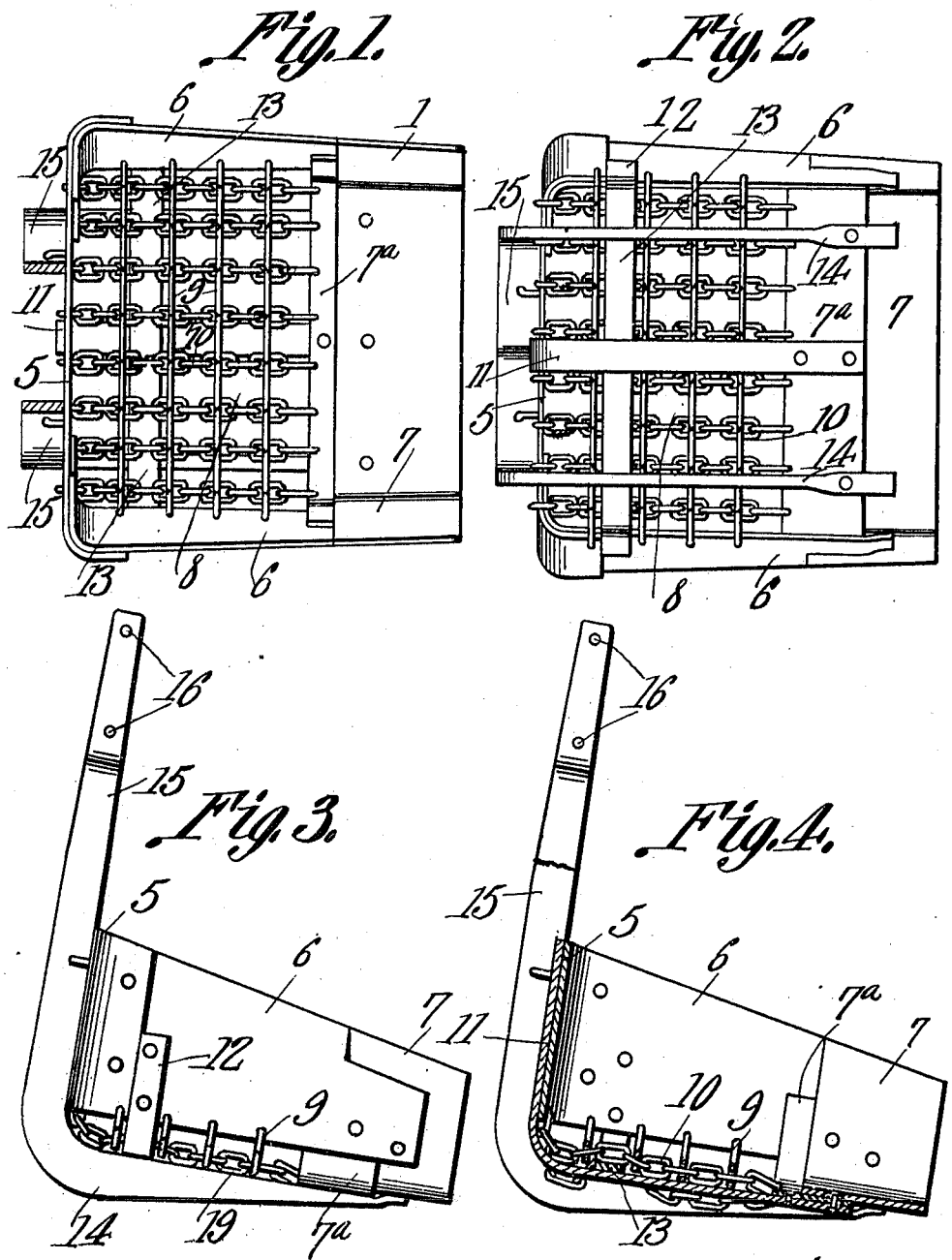

ALBERT N. CROSS, OF TOMAH, WISCONSIN.

SCOOP.

990,232.

Specification of Letters Patent.

Patented Apr. 25, 1911.

Application filed June 13, 1910. Serial No. 566,615.

*To all whom it may concern:*

Be it known that I, ALBERT N. CROSS, a citizen of the United States, residing at Tomah, in the county of Monroe and State of Wisconsin, have invented a new and useful Scoop, of which the following is a specification.

It is the object of the present invention to provide an improved excavator scoop for use in connection with an excavator such as shown in my prior Patent No. 808,345, dated December 26, 1909, and it is the primary aim of the invention to provide a scoop so constructed that where the same is employed in excavating clayey soil, the soil will not become packed or caked upon the interior of the scoop as occurs in the use of the ordinary form of scoop. In the use of the ordinary scoop, it is customary, in dumping a scoop to overturn the same and after the soil packs in the scoop, blows are struck upon the bottom of the scoop or the scoop is righted and the caked soil is removed with a shovel or other similar implement. However, by striking blows upon the bottom of the inverted scoop, the scoop is soon so battered as to be worthless and after the soil is removed by scraping the inner faces of the walls of the scoop, the scoop must be righted so that considerable time is lost in reinverting it. The present invention therefore aims to so construct the scoop that when the same is inverted, the soil which may tend to pack or cake in the bottom of the scoop, will be dislodged and this is accomplished by forming a portion of the area of the bottom of open material, such as chain link mesh.

In the accompanying drawings,—Figure 1 is a top plan view of an excavator scoop constructed in accordance with the present invention. Fig. 2 is a bottom plan view thereof. Fig. 3 is a side elevation, and Fig. 4 is a vertical sectional view taken in a plane from front to rear.

In the drawings, the rear wall of the scoop is indicated by the numeral 5 and its side walls by the numeral 6, these rear ends of the said side walls and the ends of the said rear wall being overlapped as illustrated in the drawings and riveted together, although these walls may be made integral if desired. In addition to the rear side walls, the scoop includes a bottom wall, one portion of which is of sheet metal and is imperforate, this portion being indicated by the numeral 7 and having its ends bent up and riveted to the forward ends of the side walls of the scoop. While this imperforate portion of the bottom wall of the scoop is illustrated in the drawings as made up of two sections, one of which, indicated by the numeral 7ª, is disposed in overlapped relation beneath the other or forward section, the said portion of the bottom of the scoop may be made integral, if desired. The bottom of the scoop further consists of a foraminous part which is preferably of chain link mesh material and is indicated in general by the reference numeral 8, it being made up of links 9 extending in a direction transversely of the scoop, and other links 10 extending in a direction from front to rear of the scoop.

A strip 11 is secured at one end to the rear side of the back wall 5 of the scoop and is bent to extend forwardly beneath the lower edge of this said back wall and medially of the bottom and secured at its front end to the under side of the section 7ª of the imperforate portion of the bottom of the scoop. A similar strip 12 is secured at its ends to the outer faces of the side walls 6 of the body of the scoop and has its intermediate portion extending transversely of the bottom of the scoop and beneath the foraminous portion 13, it being understood that the strips 11 and 12 cross each other about the middle of the foraminous portion of the scoop bottom. It will be observed from an inspection of the drawings, that the mesh portion of the bottom of the scoop is loose and when the scoop is in upright position, this said mesh rests upon the bar 11 and the portion 13 of the bar 12. It will be readily understood, however, that when the scoop is inverted so as to discharge its contents, the wire mesh will drop or sag down with a sudden movement which will act to dislodge from it any particles of soil which may have become caked thereon. It will further be understood that this dislodging of the soil is automatically accomplished by the sag in the chain mesh and that it is unnecessary to remove the caked soil with a shovel or other similar implement.

Runners 14 are secured at their forward ends to the section 7ª of the bottom of the scoop and extend rearwardly in spaced relation beneath this bottom upon two opposite sides of the strip 11 and the bars comprising the runners are then bent to extend vertically back of the back wall 5 of the scoop, as at 15, and at their upper ends are connected, as at 16, and afford means whereby the scoop may be supported upon the walking beam of the excavator shown in my said prior patent.

What is claimed is:

1. In a scoop of the class described, a body comprising side walls, a rear wall connecting the side walls at their rear ends, a bottom comprising an integral forward portion extending between the forward ends of the side walls, and a foraminous portion comprising chain mesh secured to the rear edge of the said integral portion of the bottom, to the lower edges of the side walls, and to the lower edge of the rear wall, the said chain mesh being loose and arranged to sag.

2. In a scoop of the class described, a body comprising side walls, a rear wall connecting the side walls at their rear ends, a bottom comprising an integral forward portion extending between the forward ends of the side walls, and a foraminous portion comprising chain mesh secured to the rear ends of the said integral portion of the bottom, to the lower edges of the side walls, and to the lower edge of the rear wall, the said chain mesh being loose and arranged to sag, and runners extending beneath the bottom of the scoop body and arranged to have the chain mesh rest thereon and sag therebetween.

In testimony that I claim the foregoing as my own, I have hereto affixed my signature in the presence of two witnesses.

ALBERT N. CROSS.

Witnesses:
C. A. MEADE,
JOHN N. GLASS.

---

Copies of this patent may be obtained for five cents each, by addressing the "Commissioner of Patents, Washington, D. C."